United States Patent [19]

Dejaiffe et al.

[11] 4,328,019
[45] May 4, 1982

[54] MELTING SYSTEM AND PROCESS FOR USE IN THE PRODUCTION OF HIGH TEMPERATURE MINERAL WOOL INSULATION

[75] Inventors: Robert Dejaiffe, Aurora; Edward L. Kells, Batavia, both of Ill.

[73] Assignee: Forty-Eight Insulations, Inc., Aurora, Ill.

[21] Appl. No.: 125,797

[22] Filed: Feb. 29, 1980

[51] Int. Cl.³ .................................................. C03B 3/00
[52] U.S. Cl. .......................................... 65/19; 65/27; 65/134; 65/335; 65/347; 65/374.15
[58] Field of Search ............... 65/27, 19, 335, 374.15, 65/347, 134

[56] References Cited

U.S. PATENT DOCUMENTS

| | | | |
|---|---|---|---|
| 1,443,767 | 1/1923 | Stafford | 65/27 X |
| 1,610,377 | 12/1926 | Hitner | 65/335 X |
| 1,870,636 | 8/1932 | McIntyre et al. | 65/335 X |
| 1,905,534 | 4/1933 | Wadman | 65/335 X |
| 2,114,545 | 4/1938 | Slayter | 65/27 X |
| 2,272,217 | 2/1942 | Longenecker | 65/27 X |
| 3,134,660 | 5/1964 | Long | 65/374.15 X |
| 3,607,190 | 9/1971 | Penberthy | 65/27 X |
| 4,040,795 | 8/1977 | Jung | 65/134 X |
| 4,248,616 | 2/1981 | Seng et al. | 65/27 X |

*Primary Examiner*—Arthur D. Kellogg
*Attorney, Agent, or Firm*—Marvin A. Naigur; John E. Wilson; John J. Herguth, Jr.

[57] ABSTRACT

A method and apparatus for melting low-cost raw materials such as blast furnace slag, basalt, feldspar or electrophos slag in the formation of high temperature mineral wool insulation. The low-cost mineral stock material is fed in particulate form continuously to a preheater in which it is elevated to a temperature range of between 1500° F. and 2000° F. by forcing hot combustion gases through a vertical column of the particulate stock material. Volatiles such as water and carbon dioxide are thus removed from the stock material. The preheated stock material is distributed to the top of an electric melting furnace which is essentially sealed from atmosphere. A substantially homogenous, low viscosity liquid glass melt is continuously discharged from the furnace.

21 Claims, 5 Drawing Figures

MELTING SYSTEM AND PROCESS FOR USE IN THE PRODUCTION OF HIGH TEMPERATURE MINERAL WOOL INSULATION

BACKGROUND OF THE INVENTION

This invention relates to the production of mineral wool insulation and more particularly, it concerns an improved method and apparatus for melting raw materials used in the manufacture of high temperature mineral wool insulation.

In the manufacture of high temperature mineral wool insulation such as rock wool blankets for insulating boilers and other surfaces heated to temperatures of 1200° F., from blast furnace slag, basalt and other low-cost, primarily siliceous raw materials, a liquid or glass melt is first formed for subsequent fiberizing to provide the insulation product. Because of the high temperatures required to melt the raw materials or rock and in part also because of the composition of the material, present melting processes are limited largely to the use of metallurgical cupolas in which the rock is placed directly onto a bed of burning coke so that on melting, the molten rock or glass drips out of the bed for collection and passage to a fiber forming station or a fiberizer.

The process presently in use is fraught with numerous problems including increasingly high costs, limited range of glass compositions capable of being used, environmental contamination and inconsistencies in the product formed. For example, the availability of coke sufficiently high in quality to withstand handling in the melting process without loss due to coke breakage and to be free of impurities which could contaminate the glass melt has steadily deteriorated with the result that increased costs of the coke itself represent substantially added costs to the present process. Irregularity in the operation of the cupola adversely affects melting and delivery rates to the fiberizer. In the present process, for example, the cupola is charged periodically at fifteen to twenty minute intervals with additional coke and rock. Such a loading cycle results in a thermal cycle in the cupola which, in turn, causes inconsistent melting and delivery rates. Because of the requirement for combustion air to pass through the coke and rock bed, all of the particulate and chemical emissions of the combustion process are passed from the cupola and require treatment for compliance with environmental standards. The requirement for passing combustion air through the bed limits the size of rock and coke particles in the sense that they must be large enough to allow passage of the combustion air. Also, there is a limit to the range of rock composition that can be effectively melted and assimilated in the stream of glass which drips from the bed.

Although many of the problems presented by the present process of melting slag and low-cost rock for the production of high temperature mineral wool insulation could be avoided by the substitution of an electric melting furnace for the cupola of the present process, a combination of the high temperatures required to melt and retain the molten rock or raw materials for delivery to the fiberizer as well as the chemically active character of the glass formed from these raw materials is severely limiting. For example, the glass formed from slag and other comparable low-cost rock materials is strongly alkaline. When heated to the temperatures required to provide a homogeneous, low viscosity melt, the melt reacts with and deteriorates most types of refractory linings needed to prevent loss of heat from the melt to the exterior of the receptacle or furnace in which the melt is formed. In light of this characteristic, furnace wall cooling techniques have been attempted to maintain a temperature equilibrium by which the molten glass is contained within a lining constituted by a solidified layer of the same glass. The high heat losses experienced with this type of electric melting furnace, however, results in an economic deterrent to the use of an electric melting furnace for the cupola of the present process. While the problems associated with the cupola of the presently used process, therefore, justify serious consideration of an electric melting system, particularly from the standpoint of attaining a more consistent product by virtue of the added facility for temperature controls and continuity provided by such systems, there is an acute need for improvement in apparatus for melting the rock, retaining the molten rock in a homogeneous, low viscosity condition for delivery to the fiberizer as well as for a system and method of operating the system in the handling of low-cost materials of the type aforementioned.

SUMMARY OF THE INVENTION

In accordance with the present invention, low-cost mineral stock material or rock such as blast furnace slag, basalt, feldspar or electrophos slag, in particulate form, is fed continuously to a preheater in which the temperature of the rock is elevated to above the slaking temperature thereof to assure the removal of all volatile oxides such as carbon dioxide and the like as well as all chemically combined water. The preheated and dried rock is then passed to the top surface of a liquid melt in an electric melting furnace having a carbon lining extending up to a discharge slot through which the molten glass is continuously discharged for passage to a fiberizer. The level of the liquid melt is maintained substantially constant so that the carbon lining of the furnace remains submerged by the liquid melt. The level is maintained by the continuous discharge of glass melt from the furnace combined with the continuous introduction of the preheated mineral stock material which is assimilated into the melt.

The preheater is preferably a vertically oriented hollow structure having a sealed inlet for particulate material at its top and extending downwardly to a shelf to provide a free standing column of the particulate material or rock. A burner is located in a chamber in the region of the shelf and hot gases from the burner are drawn upwardly through the rock column by an exhaust fan near the upper end of the preheater but laterally offset from the inlet. The temperature of the rock at the shelf is monitored to control the burner to maintain the preheated temperature of the rock substantially constant.

The preheated rock is fed to the electric melting furnace by a branched gravity feed conduit system and through the top of the furnace chamber so that the rock is deposited on the top of the melt in a plurality of discrete areas or piles substantially over the surface thereof except for a region or area in the vicinity of the discharge slot. The carbon electrodes are suspended to depend through the cover of the furnace and into the melt. The arrangement of electrodes effects a circulation of the relatively low viscous melt upwardly under the preheated stock material so that the latter is rapidly and continuously assimilated in the liquid melt.

Because of the temperatures of the melt in the furnace and also because of the chemical characteristics of the melt, the furnace is lined on its bottom and sides with a relatively thick lining of elemental carbon up to a level substantially at the plane defined by the top of the liquid melt. The carbon lining preferably includes an inner lining of carbon brick backed by a tamped outer lining of carbon paste. An external steel shell encloses the carbon lining. A castable refractory is provided above the top surface of the liquid melt and extends throughout the internal crown or cover of the furnace. Erosion of the carbon brick and the castable refractory at the top of the liquid melt is prevented by water cooling only in the region of the top of the liquid melt and in a manner to establish a thermal equilibrium by which a small vertical band of fused or solidified melt functions as an inner lining at the upper edge of the carbon brick.

Among the objects of the present invention are, therefore: the provision of an improved method and apparatus for converting low-cost mineral stock material to a homogeneous and uniform glass melt to be fiberized in the formation of mineral wool; the provision of such a method and apparatus in which heating efficiency is optimized; the provision of such a method and apparatus which is adaptable to a wide range of stock materials; and the provision of such a method and apparatus which is easily controlled in the practice of a continuous melting operation.

Other objects and further scope of applicability will become apparent from the detailed description to follow taken in conjunction with the accompanying drawings in which like parts are designated by like reference numerals.

DETAILED DESCRIPTION OF THE PREFERRED EMBODIMENT

Figure 1:
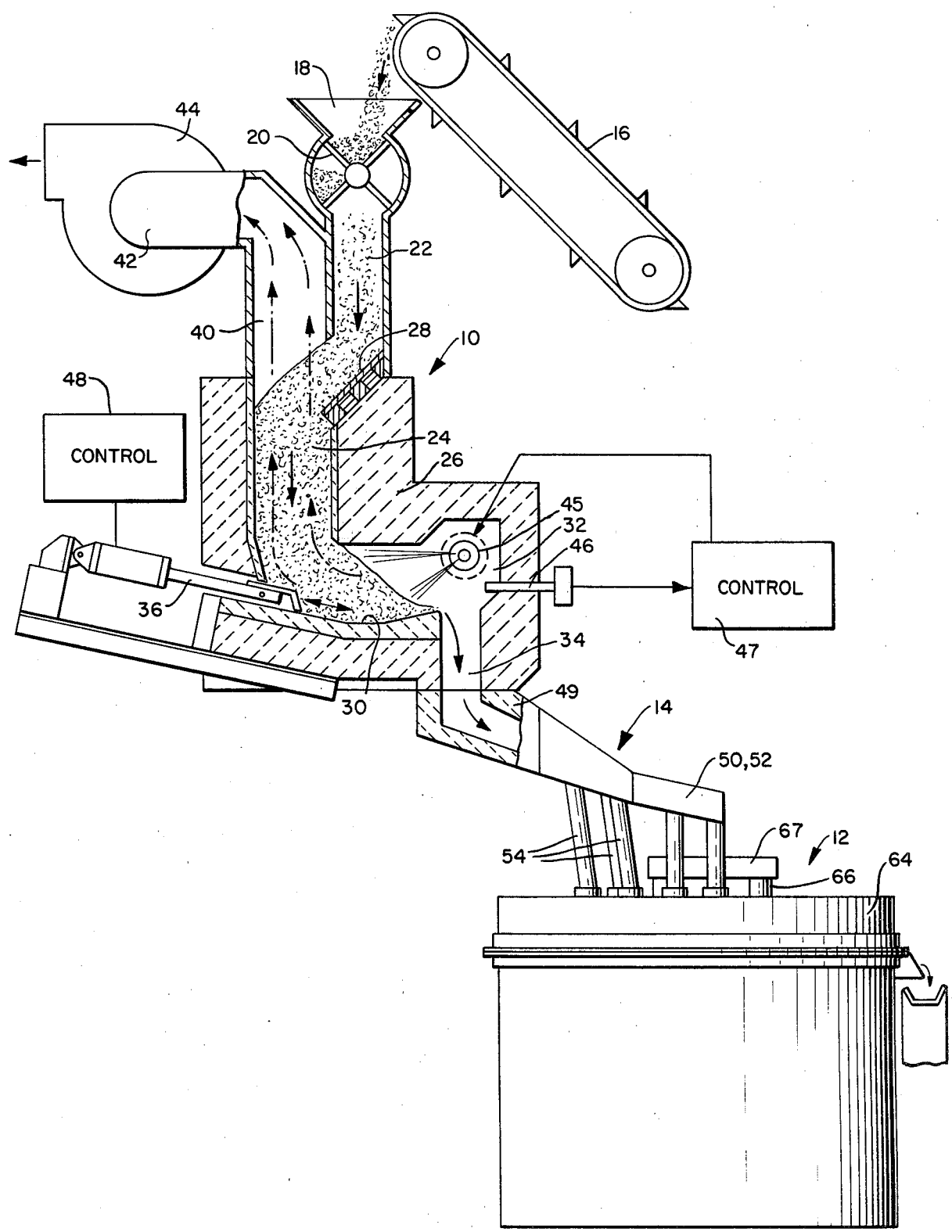
FIG. 1 is a largely schematic side elevation in partial cross-section illustrating the apparatus of the invention.

In FIG. 1 of the drawings, the overall system of the present invention is shown to include generally a preheater or dryer 10, an electric melting furnace 12 and a conduit system 14 by which particulate stock material, preheated in the preheater 10, is fed to the melting furnace 12. The preheater 10 is supplied with particulate mineral stock material by suitable means such as a bucket conveyor 16 from a source (not shown). The stock material is deposited in an inlet hopper 18 which opens through a rotatable seal 20 to a vertical feed chute 22. The seal 20 is of a type known as a rotary star seal and functions in the preheater to minimize the passage of air from the hopper 18 to the chute 22.

The chute 22 opens at its lower end to a heating chamber 24 enclosed by a high temperature refractory 26, preferably bubbled alumina, from an inclined ramp 28 which, in effect, displaces the heating chamber 24 laterally from the feed chute 22. The lower end of the heating chamber 24 is defined by a shelf 30 which is located in the region of a burner chamber 32 and an outlet 34 for discharging preheated particulate stock material from the preheater or dryer 10. At least one and preferably two hydraulic or otherwise suitably actuated pushers 36 are arranged for reciprocating pushing movement on the shelf 30 to regulate the discharge of preheated particulate stock material through the outlet 34. Although only one such pusher 36 is illustrated in FIG. 1, it is contemplated that at least two such pushers will be used in practice and synchronized for alternate back and forth reciprocation along the shelf 30.

The heating chamber 24 extends upwardly as a flue 40 which passes to the inlet 42 of a fan or exhauster 44. Thus, hot combustion gases issuing from a burner 45 in the burner chamber 32 will be forcibly drawn through the particulate material in the heating chamber 24 and discharged by the exhauster 44.

To control the temperature to which the particulate stock material is heated in the chamber 24, a temperature sensor 46 is mounted to extend within the burner chamber 32. Signals corresponding to temperature of the rock at the shelf 30 are passed from the sensor 46 to a control 47. The control 47, in turn, regulates operation of the burner 45 to maintain the temperature of the rock within a relatively narrow range of temperatures.

A feed rate control 48 is connected to, and operates to control, the pushers 36 according to the desired feed rate.

The conduit system 14 transfers the preheated particulate stock material from the outlet 34 to the electric furnace or melter 12 as indicated defining a closed system. As may be seen in FIGS. 1 and 4 of the drawings, the conduit system 14 is branched so that the preheated particulate material from the outlet 34 flows by gravity to a main inclined conduit or chute 49 to a pair of branch conduits or chutes 50 and 52 from which a plurality of feeder tubes 54 extend to the top of the melting furnace 12. Though not illustrated in the drawings, it is contemplated that the conduit system may be equipped with appropriate, damper-like deflectors so that the relative flow or distribution of particulate material to the respective tubes 54 may be regulated.

Figure 2:
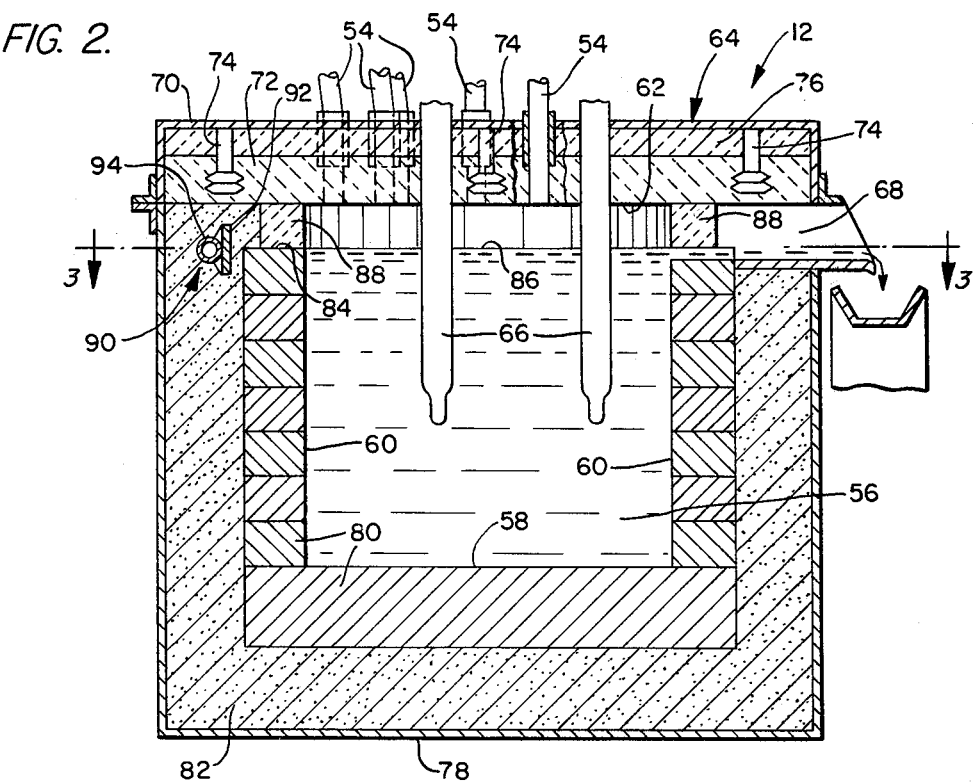
FIG. 2 is a cross-section on line 2—2 of FIG. 3.
Figure 3:
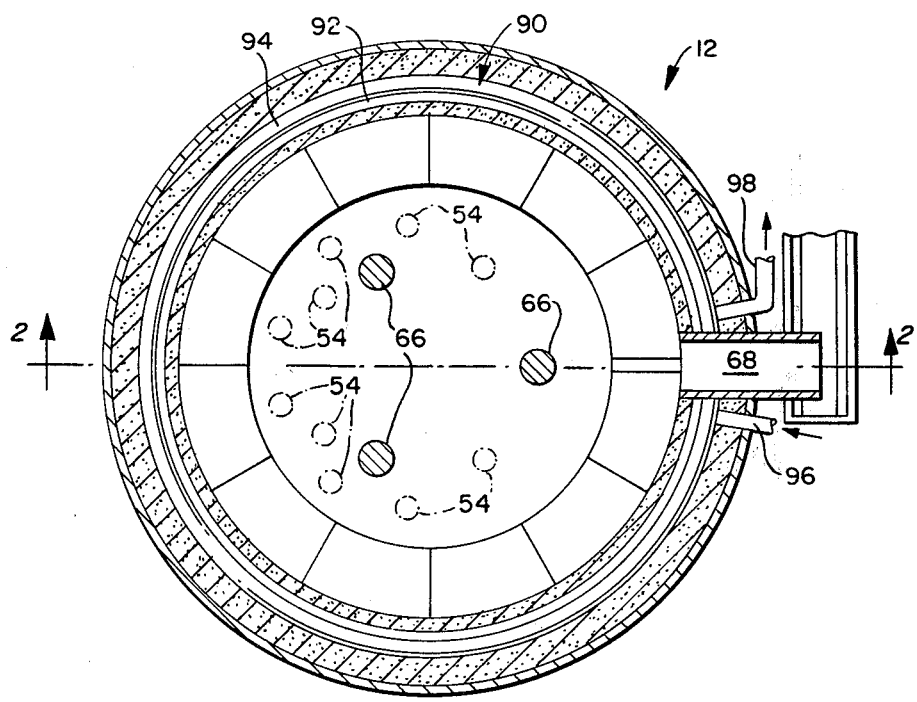
FIG. 3 is a cross-section on line 3—3 of FIG. 2.
Figure 4:
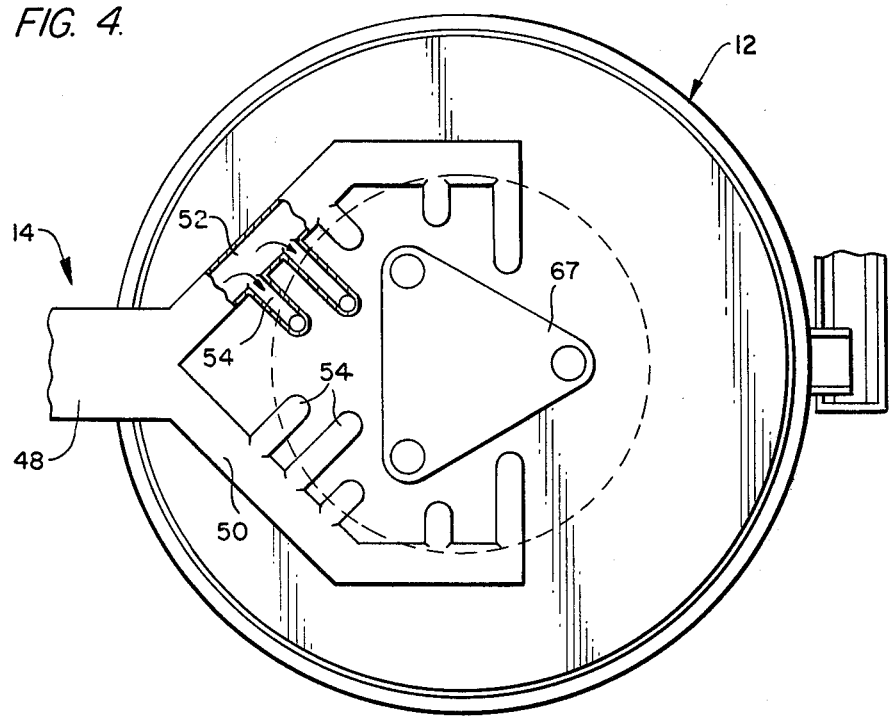
FIG. 4 is a plan view of a melting furnace used in the invention.

As shown most clearly in FIGS. 2–4 of the drawings, the melting furnace 12 in the disclosed embodiment is in the form of a cylindrical vessel having an interior melt chamber 56 defined by a bottom wall or floor 58, vertical sidewalls 60 and a top wall 62 established by a cover or crown 64. Heat transfer from the high temperature melting chamber 56 to the exterior of the furnace is prevented or at least substantially inhibited by a thermal insulation system in the walls 58, 60 and 62 to be described in more detail below.

As shown most clearly in FIGS. 2–4, a plurality, specifically three carbon electrodes 66 are supported to extend through openings in the cover or crown 64. The electrodes 66 depend from an exterior support 67 to extend substantially into the melt chamber 56 and operate conventionally to heat a liquid or glass melt contained in the chamber 56 by submerged arc heating, resistance heating or a combination of these types of electrical heating. Also, electrical induction heating is contemplated. As may be seen in FIG. 4, the tubes 54 by which preheated particulate material is introduced through the cover or crown 64 are arranged in a pattern such that the material will be deposited in substantially discrete or separated piles located throughout the horizontal area of the chamber 56 except in an area or region in the proximity of a melt discharge slot or trough 68 through which a molten glass melt is discharged from the chamber to a fiberizer (not shown) and by which the melt is converted to fiber form in the production of rock wool insulation, for example.

The system of thermal insulation incorporated in the walls of the furnace 12 is important to thermal efficiency of the overall system and to the attainment of a substantially homogeneous liquid melt in the chamber 56. Thus, the crown 64 is constituted by an outer structural support 70 which though represented in FIG. 2 as only a steel shell may, in practice, additionally include a frame or grid of structural members. A relatively thick inner layer 72 of castable refractory, preferably bubbled alumina, is supported from the exterior structure or shell 70 by hangers 74. A layer 76 of refractory insulation is sandwiched between the exterior steel shell 70 and the refractory layer 72.

The bottom and side walls of the furnace 12 are formed by an exterior, substantially sealed steel shell 78, an inner lining 80 of carbon brick and an outer lining 82 of a plastic carbon refractory exemplified by carbon refractory composition commercially available from Union Carbide Corporation under the name "COLD RAMMING CARBON PASTE, Grade RP-3". As may be seen in FIG. 2, the carbon brick 80 extends upwardly from the floor 58 along the sidewalls 60 of the furnace to an upper edge or course 84 which lies in a horizontal plane 86 defined by the level of liquid melt in the chamber 56. A ring 88 of refractory, again preferably bubbled alumina, extends between the top edge 84 of the brick 80 and the under surface of the layer 72 in the crown 64.

Spaced from the outside surface of the brick 80 at the plane 86 separating the top edge 84 of the carbon brick and bubbled alumina ring 88 is a water cooled ring 90. The ring 90 includes a fin-like plate 92 welded or otherwise integrated with a conduit 94 for a coolant such as water circulated through inlet and outlet conduits 96 and 98, respectively, as illustrated in FIG. 3.

It is understood that a water jacket, or the like, may be disposed around the shell 40 for safety purposes, or other reasons.

In the operation of the system illustrated in the drawings to practice the method of the present invention, a variety of mineral stock material exemplified by blast furnace slag, basalt, feldspar and electrophos slag may be used. Such stock material is abundant, low in cost and is primarily constituted by mineral oxides which melt at temperatures above 1700° F. The stock material is crushed or otherwise particulated to pass sieve sizes of from ¼" to 1½" and preferably ½" to 1½". Particles smaller than ¼" tend to block passage of combustion gases through the column or bed in the chamber 24 of the preheater 10 or tend to be withdrawn by the exhaust fan 44. Particles larger than 1½" increase the time required either to preheat the stock material to above slaking temperatures or to be assimilated by the melt in the furnace 10. Also, excessively large particles block or otherwise reduce the effectiveness of the conduit system 14.

Upon passing from the inlet of the chamber 24 to the outlet chamber 34 of the preheater 10, the temperature of the particulate stock material is raised to within a range of from 1500° F. to 2000° F. Preferably the stock material is heated uniformly to be discharged from the preheater at about 1900° F. This temperature is above the slaking temperature of all constituents of the stock material and thus assures that all volatile oxides and chemically combined water will be burned out or otherwise removed in a time period of twenty minutes or less.

Also at this temperature, the stock material flows freely as a result of its retaining a solid state. At temperatures in excess of 2000° F., melting of some of the constituents may occur causing a stickiness which will impede free flow of the particulate material from the preheater to the furnace 12.

The removal of volatile compounds which adversely react with carbon, principally oxides such as carbon dioxide as well as water, is important particularly to maintaining the integrity of the carbon electrodes 66 and the carbon brick lining 80 of the melting furnace 12 and, in an induction furnace, the carbon susceptor. In addition, the elevation of the stock material temperature to lower than but close to the melting temperature of the material facilitates the assimilation of the particulate stock material into the liquid melt within the melt chamber 56 of the furnace 12. Also, the thermal efficiency of the system is augmented by the dual drying and heating functions of the preheater 10 coupled with a reduction in the amount of heating required of the melting furnace 12.

Electric heating of the melt in the chamber 56 of the furnace 12 further elevates the temperature of the stock material to discharge a homogeneous, relatively low viscosity melt at a temperature of approximately 2600° F. Also, it should be noted in this respect that the action of three electrodes 66 within the melting chamber 56 causes a thermal circulation of the molten rock or glass upwardly against the underside of the freshly deposited solid rock. In this respect, the deposition of the preheated rock on the surface of the melt as discrete piles causes a natural rolling or presentation of separate particles successively to the melt. In this way, the rock is assimilated into the melt without formation of an ice-like or fused shelf of glass between the melt and the stock material. Thus, synchronized introduction of preheated rock material and discharge of molten glass from the furnace 12 will result in a continuous delivery of homogeneous glass melt to the fiberizer (not shown) at which the melt is converted to fiber form. Equally as important, control over the feed rate, melting rate and discharge rate from the furnace 12 enables the level of the melt in the chamber 56 to be maintained fairly constantly at the predetermined plane 86 defining the upper edge 84 of the carbon brick lining 80.

Although the composition of the melt may vary, a typical example of melt composition resulting from practice of the present invention is represented by the following:

| Compound | Percentage by Weight | Variation (+ or −) |
|---|---|---|
| $SiO_2$ | 40% | 3% |
| CaO | 37 | 3 |
| MgO | 10 | 2 |
| $AL_2O_3$ | 9 | 2 |
| FeO | 2 | 2 |
| Other | 2 | 1 |

Figure 5:
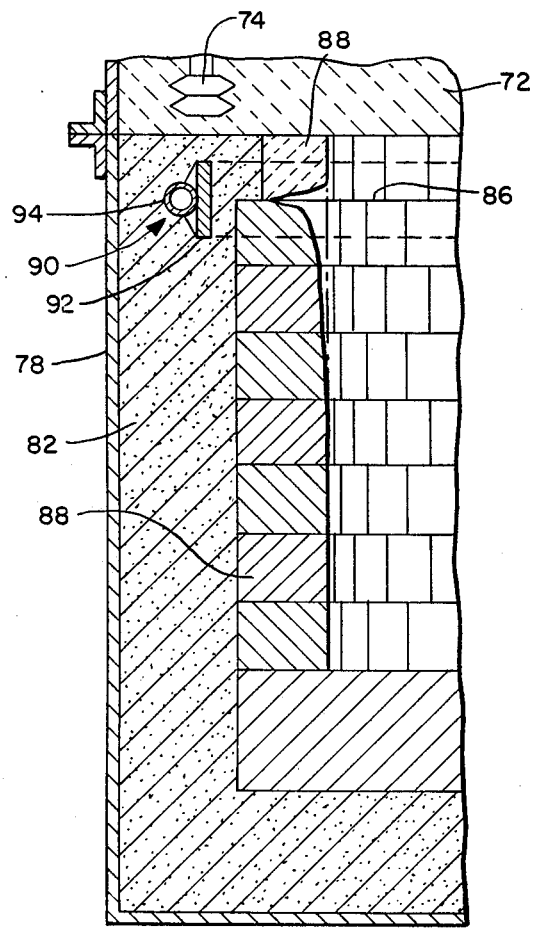
FIG. 5 is an enlarged fragmentary cross-section similar to that shown in FIG. 2.

Because the carbon brick will burn in air or when exposed to oxygen, maintaining the level of molten rock constantly at the plane 86 assures that the carbon brick will at all times be submerged in the molten rock. The level of the liquid melt will vary slightly, however, and result in a deterioration or erosion of both the upper course of refractory brick and the ring 88 of alumina in the upper region of the chamber 56. To prevent this deterioration of the refractory lining from progressing beyond an acceptable limit as represented, for example, in FIG. 5, a thermal equilibrium is developed in the glass melt by the cooling ring 90 so that a narrow band of solidified glass will develop between the liquid glass and the inner surface of the furnace walls in the region of the cooling ring 90. Deterioration of the lining beyond the approximate condition shown in FIG. 5 is prevented by the development of a solid glass lining in a vertical region or band corresponding approximately to the vertical dimension of the cooling fin 92.

From the foregoing, the many advantages of the system and method of the present invention will be apparent. For example, a substantial isolation of the rock feed and the melt chamber within the furnace 12 in a closed system sealed from the atmosphere not only facilitates the use of the carbon lining in the furnace 12 but also minimizes oxidation of the carbon electrodes by which the glass melt is heated. In this respect, carbon is the only known refractory capable of withstanding the corrosive effects of a glass melt formed from the low-cost raw materials mentioned and yet is vulnerable to oxidation when exposed to air or volatile oxides of any type which may be carried into the melt chamber with the stock material feed. The preheater 10 contributes to the effectiveness of the overall system in the sense that it allows the use of virtually any fuel to bring the temperature of the stock feed up to within a range very close to the melting point of the material. The organization of the preheater by which the hot combustion gases and air are forcibly withdrawn through the bed acts effectively as a filter by which dust or powder-like particulates generated in the furnace and feed system are removed. Also, the facility provided by the conduit system 14 for distributing the preheated rock feed to the liquid glass melt in the furnace 12 is important from the standpoint of rapid assimilation of the rock into the liquid melt without placing an excessive heat generating burden on the electric furnace.

Thus it will be appreciated that as a result of the present invention, a highly effective melting system and process is provided by which the above-mentioned objectives are completely fulfilled. It is equally apparent that modifications and/or changes may be made in the disclosed embodiment without departure from the invention. Accordingly, it is expressly intended that the foregoing description is illustrative of a preferred embodiment, not limiting, and that the true spirit and scope of the present invention be determined by reference to the appended claims.

We claim:

1. The method of converting particulate mineral stock material having the melting characteristics of blast furnace slag, including a sharp melting point and low viscosity in the liquid state, to a liquid melt in a carbon-lined electric melter in the production of mineral wool, said method comprising the steps of:
   preheating the particulate stock material to temperatures in the range of from approximately 1500° F. to 2000° F. to remove substantially all volatile oxides and chemically combined water, which adversely react with carbon, from said particulate material while heated to within said range;
   feeding the preheated particulate material to the electric melter; and
   further heating said particulate material in said melter to form a substantially homogeneous liquid glass melt at a temperature corresponding to a preferred viscosity.

2. The method recited in claim 1, wherein said stock material is uniformly preheated within said range to a temperature above the slaking temperature and below the melting temperature thereof.

3. The method recited in claim 1, wherein said stock material is uniformly preheated to approximately 1900° F.

4. The method recited in either of claims 1, 2 or 3, wherein said preheating step includes forcing hot gases through a bed of said stock material.

5. The method recited in either of claims 1, 2 or 3, wherein said feeding step includes distributing said particulate stock material to discrete spaced areas on the top of said liquid glass melt in said melter.

6. The method recited in either of claims 1, 2 or 3, wherein said preheating step is carried out continuously.

7. The method recited in claim 5, including the step of continuously discharging said liquid glass melt from said melter.

8. The method recited in either of claims 1, 2 or 3, wherein said carbon-lined melter includes a lining of carbon extending from the top level of said liquid glass melt downwardly and a refractory lining above said top level of said liquid glass melt and including further, the step of forming a band of solid glass on the inner surface of said carbon and refractory linings only in the region of the top level of said liquid glass melt.

9. Apparatus for converting particulate mineral stock material to a substantially homogeneous liquid melt in the production of high temperature mineral wool, said apparatus comprising:
   a carbon-lined electric melting furnace;
   a preheater connected to the furnace to define a closed system substantially isolated from the atmosphere, said preheater having a particulate material inlet, a particulate material outlet, a source of hot gases and means for passing said hot gases in heat exchange relation to said particulate material, to elevate the temperature thereof and to remove substantially all water and other volatile oxides from said particulate material, and for forcing said volatile oxides away from the carbon-lined electric melting furnace.

10. The apparatus recited in claim 9, wherein said preheater includes means to substantially seal said particulate material inlet against the introduction of air through said inlet.

11. The method recited in claim 9, wherein said preheater includes a generally vertical heating chamber, a generally horizontal shelf between said heating chamber and said particulate material outlet and means to control the feed of said particulate material from said shelf to said particulate material outlet.

12. The apparatus recited in claim 11, wherein said feed control means comprises at least one reciprocal pusher means operative to discharge said particulate material from said shelf to said particulate material outlet.

13. The apparatus recited in either of claims 11 or 12, wherein said source of hot gases comprises a burner chamber positioned laterally from said heating chamber at the level of said shelf.

14. The apparatus recited in claim 13, including a burner in said burner chamber, means to sense the temperature of material in said heating chamber, and means to regulate said burner in accordance with the temperature of material in said heating chamber.

15. The apparatus recited in claim 9, wherein said carbon-lined furnace comprises a carbon lining about the bottom and sides of said melt chamber up to a plane defined by the top of said liquid melt, a cast refractory lining over the top of said chamber and down to the upper edge of said carbon lining, and cooling means to solidify said glass melt on the inner surface of said linings in a narrow band spanning the juncture of said carbon and refractory linings.

16. The apparatus recited in either of claims 9 or 15, wherein said electric furnace comprises three spaced carbon electrodes depending from the top of said melting chamber.

17. The apparatus recited in claim 15, wherein said carbon lining comprises an inner lining of carbon brick and an outer lining of carbon paste.

18. The apparatus recited in claim 17, comprising a closed steel shell on the exterior of said outer lining.

19. The apparatus recited in claim 9, wherein said means for passing said hot gases includes means for forcibly drawing said gases through said particulate material.

20. The apparatus recited in claim 9, wherein the furnace includes liquid melt outlet means for discharging a liquid melt formed in said furnace in a manner to maintain a constant depth of liquid melt in said furnace.

21. The apparatus recited in claim 20, further comprising means for transferring heated particulate material from the particulate material outlet of the preheater to a plurality of spaced, discrete areas on top of said liquid melt.

* * * * *